Patented Nov. 4, 1930

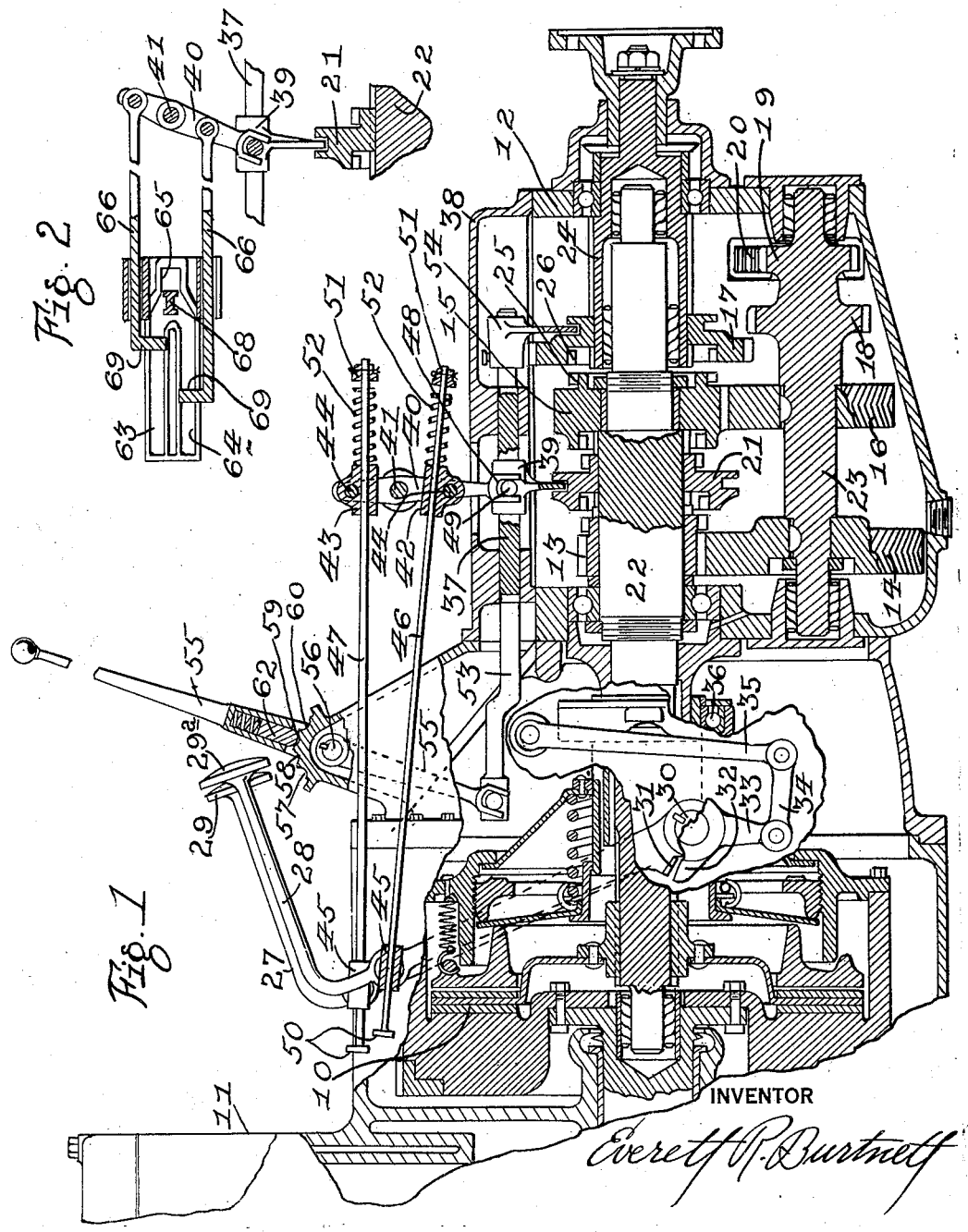

1,780,460

UNITED STATES PATENT OFFICE

EVERETT R. BURTNETT, OF PASADENA, CALIFORNIA

ENGINE-CLUTCH-CONTROL-ACTUATED SPEED-CHANGE MECHANISM FOR TRANSMISSION GEARING

Application filed December 17, 1929. Serial No. 414,655.

My invention relates to engine main clutch actuating speed change mechanism for motor vehicle transmission gearing and among the principal objects of my invention are, the provision of two clutch throw-out levers, preferably foot actuated, with the engine to transmission clutch and connecting mechanism with a shift member of the transmission gear set, that will enable the transmission of power to be changed from one speed to another through differentiating speed ratio gearing of the gear set, by the alternate use of one or the other of the two clutch throw-out levers included in the mechanism of my invention, when acting to free the clutch to change speeds instead of acting to throw the clutch out by the use of one clutch lever only and acting separately to change the speed drive of the transmission gear set, while the clutch is held out by the one clutch throw-out pedal, by changing the position of the gear shift lever by hand.

With the conventional engine clutch, single clutch control lever system, change speed transmission and change speed gears control system, it is necessary to employ both the engine clutch foot control system and the hand operated gear shift control system to make each speed gear change, while with my improved change speed control mechanism, a change can be made from one speed drive to another by simply employing one or the other of the two clutch throw-out levers provided, each of which when pressed outwardly effect a relatively reverse movement of a change speed drive member in the transmission gear set interconnected with both clutch throw-out levers.

Further objects of my invention are to provide a main engine clutch control system for motor vehicles provided with a mechanism interconnecting the said clutch control system with a change speed shift element of the transmission gear set that will provide, when applied to a multispeed range transmission, two speed changes of the gear set by the engine clutch control system progressively before and after each one transmission gear set shift by hand.

These advantageous results are brought about by a novel multi-lever engine clutch throw-out and interconnecting clutch and gear set actuating rod system, relatively arranged operatively with each other and constructed, in assembly, so that the movement of one engine clutch throw-out lever forwardly effects the movement of a gear drive selecting member of the change speed transmission gear set in one way, and the movement of the other engine clutch throw-out lever forwardly effects the movement of the said gear drive selecting member of the transmission gear set in a relatively opposite way; in each way effecting a different speed drive of power in transmission through the gear set.

With the foregoing and other objects in view, my invention consists in certain novel features of construction and arrangement of parts that will hereinafter be more fully described and claimed and illustrated in the accompanying drawing, in which—

Fig. 1 is a vertical longitudinal section, partly in elevation of a motor vehicle engine clutch and change speed transmission gearing unit, equipped with my improved engine clutch control inter-connecting mechanism for changing speeds drive of the transmission gear set.

Fig. 2 is a top plan view of a twin parallel guide, for a single engine clutch throw-out lever modified system of actuating the speed drive change lever of a transmission gear set.

Referring by numerals to the accompanying drawings which illustrate a practical embodiment of my invention, 10 designates a main engine clutch disposed intermediately between an engine 11 and a change speed transmission gear set 12.

Change speed trains of constant mesh gears respectively made up of gears 13 and 14, gears 15 and 16 and selective type gears 17, 18, 19 and 20 are provided in the transmission gear set 12. A positive clutch member 21 is slidably mounted rotatably secure upon the main transmission shaft 22 of the gear set 12. The said positive clutch is adapted to clutch either the gear 13 by forward position or the gear 15 by rearward position.

Should the selective gear 17 be engaged with the gear 18 and the positive clutch 21 be engaged with the gear 13, power transmitted into the gear set through the main shaft 22 will be diverted through the positive clutch 21 and the gears 13 and 14 to the counter shaft 23, thence through gears 18 and 17 to a power take-off member 24, providing low or first speed drive.

With the gear 17 engaging the gear 18 and the positive clutch 21 engaged with the gear 15, the power input to the gear set through the shaft 22 will be diverted through the positive clutch 21 and the gears 15 and 16 to the counter shaft 23, and thence through gears 18 and 17 to the power take-off member 24, providing second speed.

With the gear 17 moved forward clutch engaging the gear 15, by means of clutch dogs 25 and 26, and the positive clutch 21 moved forward engaging the gear 13, the power input to the gear set through the shaft 22 will be diverted through the clutch 21 and the gears 13 and 14 to the counter shaft 23, thence through the gears 16 and 15 to the power take-off member 24 through the clutching gear 17, providing third speed.

With the gear 17 clutch engaged with the gear 15 and the positive clutch 21 moved rearwardly engaging the gear 15, the power input to the gear set through the shaft 22 will be transmitted directly through the positive clutch 21, the body of the gear 15 and the clutching gear 17 to the power take-off member 24, providing a fourth or direct speed drive. Hence with the sliding selecting gear 17 operatively engaged with either the gear 18 or clutch engaging the gear 15, the alternate movement and clutch sequence of the positive clutch 21 provides, with either position of the gear 17, a change of speed drive without shifting the gear 17.

To accomplish the alternate movement and subsequent clutch sequence of the positive clutch 21 with each sliding gear 17 selective setting, I provide two main engine clutch throw-out levers 27 and 28 each provided with a pedal, respectively designated 29 and 29ª. Each of the two engine clutch throw-out levers 27 and 28 are preferably arranged on a common pivot shaft 30, and each of the two clutch levers 27 and 28 are provided with a dog 31, to commonly engage a dog 32 provided of a crank 33, which is arranged to transmit motion through a link 34 and a lever 35 to a clutch throw-out bearing 36.

A sliding bar 37 is arranged in the cover 38 of the gear set 12. A positive clutch sliding actuating member 39 is secured with the bar 37 and a rocker lever 40 is arranged over the positive clutch actuating member 39 with a centrally located pivot pin 41. To rod boxes 42 and 43 are provided with the rocker arm 40, one at each side of the pivot pin 41 thereof and each preferably rockingly secured with the said rocker arm respectively by means of a pin 44.

A rod box 45 is provided with each of the two engine clutch throw-out levers 27 and 28 and two rods 46 and 47 are provided respectively interconnecting the two main clutch throw-out levers 27 and 28 with the rocker arm 40, one rod 46 connecting the left clutch throw-out lever 28 with the lower side of the rocker arm 40 by being fitted through the box 45 of the respective clutch throw-out lever and through the box 42 of the lower side of the rocker arm 40. The other rod 47 connecting the right clutch throw-out lever 27 with the upper side of the rocker arm 40 by being fitted through the box 45 of the respective clutch lever and through the box 43 of the upper side of the rocker arm 47.

The rocker arm 40 is shaped at its lower end in the form of a yoke 48 fitting over a pin 49 provided on two sides of the positive clutch actuating member 39, for imparting motion from the rocker arm 40 to the positive clutch actuating member 39. Each rod 46 and 47 is preferably provided with a flanged end 50 forward of the box 45 connecting the respective rod with the associate one of the two clutch throw-out levers 27 or 28, and each rod 46 and 47 is provided with a detachable flanged end 51 at its opposite end rearward of the rocker arm 40 with a spring 52 arranged over each rod between the end 51 and the rod box associating the respective rod with the rocker arm 40.

A selective gear shift bar 53 is provided in the cover 38 of the gear set with a selective gear actuating member 54 secured at the rearward end of the bar 53.

A gear shift lever 55 is provided and mounted in the usual way. Because of the progressive movement of the one shift gear 17 the shift lever is mounted for straight motion on a simple pin 56 and spring stop notches 57, 58, 59 and 60 are provided in the periphery of a guide 61 arranged with the shift lever 55 for a spring controlled trigger 62.

With reference to the mechanism illustrated by Figure 1, the operation is as follows:

Assuming the vehicle is at a stop, the shift lever is placed in a position whereof the spring trigger 62 being in the notch 8, next to the extreme forward position, the sliding selective gear 17 operatively arranged in mesh with the gear 18. The operator presses the left clutch throw-out pedal 29ª of the lever 28 forwardly quickly and lets it back for clutch engagement, the forward movement of the clutch lever 28 causing the box 45 of the left clutch lever 28 to contact the flanged end 50 of the rod 46, which latter is thus drawn forward by the clutch throw-out lever movement resulting in the spring 52 of the respective rod being compressed against the box 42, which latter is secured with the rocker arm 40, and which spring compression results in a thrust pressure being developed forwardly against the lower side of the rocker arm 40, moving the respective end forwardly and effecting the actuation of the positive clutch 21 slidably forwardly engaging the gear 13, with the positive clutch 21 engaging the gear 13, power is transmitted as described through the gears 13, 14, 18 and 17 to the power take-off member 24, providing first speed.

The car being accelerated to the desired first gear speed, the operator applies his foot to the pedal 29 of the right clutch throw-out lever 27, the rod 47 associated with this clutch throw-out lever is pulled forward in like manner as described of the rod 46 of the left clutch throw-out lever, and subsequently the rocker arm 40 is reversed by the spring thrust forwardly against the upper side of the arm 40. This action causes the positive clutch 21 to be reversed from forward clutch engagement with the gear 13 to clutch engagement with the gear 15, so that with the sliding gear yet operatively engaged with the gear 18, the power is diverted, with the release of the right clutch throw-out pedal backward, from the main transmission shaft 22 through the gears 15 and 16 and gears 18 and 17 to the power take-off member 24, providing second speed.

Shifting the gear 17 once, between second and third speeds, from operative engagement with the gear 18, to a clutching engagement with the gear 15, between main clutch throw-out lever controls of first and second and third and fourth speeds makes a second stage of main clutch lever control over the transmission gear set now available, the third and fourth speed drives being effected in the same manner, first by pressing the left 28, then the right 27, clutch throw-out lever out and back as described to effect the change from first to second speeds.

With the modified construction as illustrated in Fig. 2, two clutch throw-out lever guides 63 and 64 are provided in common with a single, clutch in position, guide 65 for the clutch throw-out lever. With the rocker arm 40 and positive clutch 21 set up as in Fig. 1, and independent rods 66 and 67 respectively provided connecting with opposite ends of the rocker arm 40 and with their forward ends 69 formed at right angles protracting transversely across the respective single clutch throw-out lever guides 63 and 64, the actuation of the single clutch lever 68 forwardly in one or the other of the two guides will alternately effect relatively reverse motion of the rocker arm 40, and subsequently actuate the positive clutch 21, as in the construction illustrated in Fig. 1.

Thus it will be seen that I have provided an engine clutch control interconnecting mechanism for changing the speeds of a transmission gear set, which is particularly adapted to actuate positive clutch type elements of change speed control in transmission gearing between next-in-ratio speeds, that is relatively simple, rugged, of low cost and fool proof of operation, the use of which will greatly facilitate rapid acceleration and traffic driving with a saving of time and effort, and afford greater ease and simplicity of motor vehicle operation.

It will be understood that minor changes in the size, form and construction of the various parts of my engine main clutch transmission speed change mechanism for transmission gearing may be made and substituted for those herein shown and described without departing from the spirit of my invention, the scope of which is set forth in the appended claims.

I claim as my invention:

1. In a speed change actuating mechanism for transmission gearing, the combination with a prime mover clutch and a set of speed differentiating gear trains having change gear engagement elements, of a plurality of prime mover clutch throw-out levers provided with the said prime mover clutch, each adopted to commonly control the said clutch, and means including separate connecting linkage provided with each of the said prime mover clutch throw-out levers operatively connecting each of the said plurality of clutch throw-out levers with the said change speed engagement elements of the said set of differentiating gear trains, each independently of the other for producing alternately a reverse motion to the said change gear engagement elements of the said speed differentiating set of gear trains, in response to the prime mover clutch throw-out actuating movement respectively of each one of the said plurality of prime mover clutch throw-out levers, when the latter are separately employed to throw out the said prime mover clutch.

2. The combination, with a prime mover clutch and a connecting change speed transmission gearing having a change gear drive engagement member, of two clutch levers provided with the said prime mover clutch, each of the two clutch levers being adapted to commonly effect a disengagement of the said clutch, actuating means provided with the said change speed gear engagement member, including a lever and associate mechanism adapted to impart two-way motion to the said change gear drive engagement member of the change speed transmission gearing, and means including separate connecting linkage provided with each of the said two clutch levers respectively connecting the said two clutch levers with the said two-way motion lever and associate mechanism of the said change gear drive engagement member of the change speed transmission gearing, each independently of the other for producing alternately an opposite motion to the said change gear drive engagement member of the change speed transmission gearing in response to the separate movement alternately of the said two clutch levers.

3. In an engine clutch control actuated speed change mechanism for transmission gearing, the combination with a main engine power transmission clutch and a change speed transmission gearing arranged for operation therewith, of two engine clutch throw-out lever members pivotally mounted on a common pin for horizontal swinging movement in a common plane on one side of the said main engine clutch, each of the said two clutch throw-out lever members being adapted to effect the disengagement of the said engine clutch, each operatively independently of the other, an alternate drive speed differentiating gear set selective member arranged intermediately of two relatively speed differentiating gear sets of the said change speed transmission gearing, means including connecting linkage connecting each of the said two engine clutch throw-out lever members operatively with the said alternate drive speed differentiating gear set selective member of the change speed transmission gearing, with the linkage of the two clutch throw-out levers relatively connected with the said speed differentiating gear set selective member of the change speed transmission gearing so as to cause alternately an opposite movement and alternate speed differentiating gear set selection of the said selective member of the change speed transmission gearing in response to the movement of each of the said two clutch throw-out lever members, alternately and independently of the other.

4. A combined main engine clutch and change speed transmission gear set control gearing including, in combination, two main engine clutch throw-out levers arranged to independently effect a common disengagement of the main engine clutch, a positive transmission clutch arranged interposed between two relatively differentiating speed gear sets in the said transmission gear set, and means including one-way actuating linkage provided with each of the said two main engine clutch throw-out levers connecting the said throw-out levers with the said positive transmission clutch, each operatively independently of the other.

5. A main engine clutch and change speed transmission gearing provided with two main engine clutch throw-out members adapted to be alternately actuated, a gear engagement member provided with two speed differentiating drive elements of the change speed transmission gearing, linkage provided with each of the two main engine clutch throw-out members, and a two-way actuating member provided with the said gear engagement member of the change speed transmission gearing with which the linkage of the two main engine clutch throw-out levers cooperate, substantially as described.

In testimony whereof I affix my signature.

EVERETT R. BURTNETT.